(12) United States Patent
Johnson et al.

(10) Patent No.: US 6,547,448 B2
(45) Date of Patent: Apr. 15, 2003

(54) EMBEDDABLE FIBER OPTIC CONNECTOR AND ASSOCIATED METHOD

(75) Inventors: Patrick S. Johnson, Tacoma, WA (US); Dennis G. Koshinz, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 98 days.

(21) Appl. No.: 09/858,119

(22) Filed: May 15, 2001

(65) Prior Publication Data

US 2002/0172470 A1 Nov. 21, 2002

(51) Int. Cl.⁷ .................................................. G02B 6/38
(52) U.S. Cl. ............................................ 385/70; 385/55
(58) Field of Search ............................. 385/53, 55, 60, 385/66, 68, 70, 76, 77, 78, 131

(56) References Cited

U.S. PATENT DOCUMENTS

| | | | | |
|---|---|---|---|---|
| 4,753,510 A | * | 6/1988 | Sezerman | 385/61 |
| 4,889,406 A | * | 12/1989 | Sezerman | 385/35 |
| 5,127,083 A | * | 6/1992 | Ikeda et al. | 385/138 |
| 5,129,032 A | * | 7/1992 | Kawai et al. | 385/76 |
| 6,000,977 A | | 12/1999 | Haake | 439/887 |
| 6,035,084 A | | 3/2000 | Haake et al. | 385/49 |
| 6,097,873 A | * | 8/2000 | Filas et al. | 385/140 |

* cited by examiner

Primary Examiner—Tulsidas Patel
(74) Attorney, Agent, or Firm—Alston & Bird LLP

(57) ABSTRACT

An embeddable fiber optic connector includes a small diameter protective sheath embedded within a plurality of composite layers of a composite structure. The sheath has a first end that is flush with a surface of the composite structure. An alignment sleeve is disposed within the sheath and an internal ferrule, mounted on an internal optical fiber, is snugly disposed within the alignment sleeve proximate a second end of the sheath. An external ferrule is mounted on an external optical fiber and is inserted into the first end of the sheath so as to be snugly disposed within the alignment sleeve proximate the internal ferrule, thereby establishing optical communications between the internal and external optical fibers. The external optical fiber is easily disconnected by gripping and removing the external ferrule from the connector. Reconnection is accomplished by reinserting the external ferrule into the connector.

28 Claims, 3 Drawing Sheets

EMBEDDABLE FIBER OPTIC CONNECTOR AND ASSOCIATED METHOD

FIELD OF THE INVENTION

The present invention relates generally to optical fiber connection devices, and more particularly to embedding such optical fiber connection devices within a composite structure.

BACKGROUND OF THE INVENTION

Composite structures are being employed in an increasing number of applications, such as a variety of automotive and aviation applications. An emerging area of interest with respect to composite structures involves the design and development of "smart structures." Smart structures generally refer to composite structures which include one or more interactive optical or electronic devices. For example, fiber optic sensors can be used to measure a wide array of structural and environmental conditions relevant to composite structural integrity. These measurements include such parameters as strain, temperature, pressure, acceleration, acoustic emission and moisture content present within the composite structure.

These sensors must be able to receive, and oftentimes transmit, signals in order to function as desired. These signals can be transmitted via optical fibers embedded in the composite structure. However, widespread use of embedded fiber optic sensors has been hampered in large part due to the lack of a robust, reliable method for egressing the embedded fiber from the composite structure or for otherwise establishing optical communication with the embedded fiber. In other words, difficulty has been encountered connecting an external optical fiber lead with the embedded fiber and optical sensor.

Conventional continuous egress methods address this problem by running or extending a continuous fiber beyond the edge of the structure during layup of the composite plies. Once cured, the composite structure contains a fiber optic lead extending beyond the edge. Oftentimes, it is desirable to trim the edge of the composite structure to properly size the composite structure and to better finish the edge surface. Difficulties arise from this method in that the structure cannot be trimmed without cutting the fiber optic lead. In addition, even if the structure remains untrimmed, the fiber is vulnerable at the point of egress and may be accidentally broken or otherwise damaged. This is especially true when the structure is being debagged or otherwise handled prior to installation. If the fiber is broken or cut, there is no easy method of reconnecting to the embedded fiber and the structure may have to be scrapped.

A variation on the edge egress methods involves egressing the optical fiber out of the top or bottom surface of the composite structure. In this case, the structure edges may be trimmed without interference from the optical fiber. However, the optical fiber is still prone to being fractured or cut while the composite part is handled during fabrication or otherwise.

In order to avoid egress of an optical fiber beyond the composite structure, a fiber optic connector could be mounted upon the optical fiber and egressed from or embedded within the composite structure. However, conventional fiber optic connectors are not effectively embeddable because they are too large and would compromise the structural integrity of the composite structure. This problem is addressed by U.S. Pat. No. 6,035,084 to Haake et al., which discloses an optical fiber extended through a microtube which is embedded in the composite. The small diameter of the microtube lessens the risk of compromising the structural integrity of the structure. However, proper alignment of the embedded optical fiber with an external optical fiber requires the use of a lens, such as a graded index (GRIN) lens. Once the external optical fiber is properly aligned using the lens, the lens and external optical fiber are bonded in place. If the external optical fiber is removed or accidentally broken, the entire alignment and bonding procedure must generally be repeated to reestablish the connection.

It would be therefore advantageous to have an improved technique for establishing and maintaining optical communications with an embedded optical fiber. In this regard, it would be desirable to establish and maintain optical communications with an embedded optical fiber in a manner that has minimal impact on the structural integrity of the composite structure, will be unlikely to be disturbed during part handling and is straightforward to utilize.

SUMMARY OF THE INVENTION

Embedded fiber optic sensors can be used to measure a wide array of structural conditions in structural parts including, but not limited to, strain, temperature, pressure, acceleration, acoustic emission and moisture content. A simple, robust technique for accessing the embedded sensors is crucial to enable widespread use of embedded fiber optic sensors in aerospace structures and other commercial applications including pressure vessels, ship and submarine structures, and manufacturing machines.

According to one aspect of the present invention a fiber optic connector adapted to be embedded within a composite structure is provided. The connector comprises a sheath, an alignment sleeve and an internal connector ferrule. The sheath is embedded within the composite structure and has an opposed first and second ends. The first end of the sheath is flush with a surface of the composite structure. The alignment sleeve is disposed within the sheath. The internal connector ferrule is mounted upon an optical fiber, and is snugly disposed within the alignment sleeve proximate the second end of the sheath. The flush arrangement of the sheath advantageously protects the connector from damage during handling or use of the composite structure.

According to another aspect of the present invention, a composite structure is provided that includes a fiber optic connector as described above that is embedded within a plurality of layers of composite laminate. At least one optical fiber is also embedded within the layers and is operable to transmit a signal through those layers and the composite structure. The optical fiber is attached at one end to the fiber optic connector and at the other end to one or more sensors, such as strain sensors. As such, the fiber optic connector facilitates reliable optical communication with the embedded sensor.

The current invention also includes a range of other aspects. The sheath can have an outside diameter of less than 0.1 inches to minimize its impact on the structural integrity of the composite structure in which it is embedded. The alignment sleeve and the internal connector ferrule can cooperate to concentrically align the optical fiber within the alignment sleeve to within 0.00004 inches for an improved optical fiber connection. The fiber optic connector can resist cure temperatures of at least 350° F. by having a sheath constructed of aluminum and the alignment sleeve and connector ferrule constructed of ceramic.

In order to communicate with the embedded sensor, an external ferrule mounted on an external optical fiber is inserted into the connector. The external connector ferrule is inserted into the connector and snugly disposed within the alignment sleeve proximate the first end of the sheath. In this arrangement, the ferrules are concentrically aligned, thereby placing the internal and external optical fibers in optical communication. This arrangement is desirable, for example, when an embedded sensor connected to the internal optical fiber must be interrogated by an analyzer connected to the external optical fiber. Disconnection and reconnection may be easily accomplished simply by removing and reinserting the external ferrule into the connector as desired.

BRIEF DESCRIPTION OF THE DRAWINGS

Figure 1:
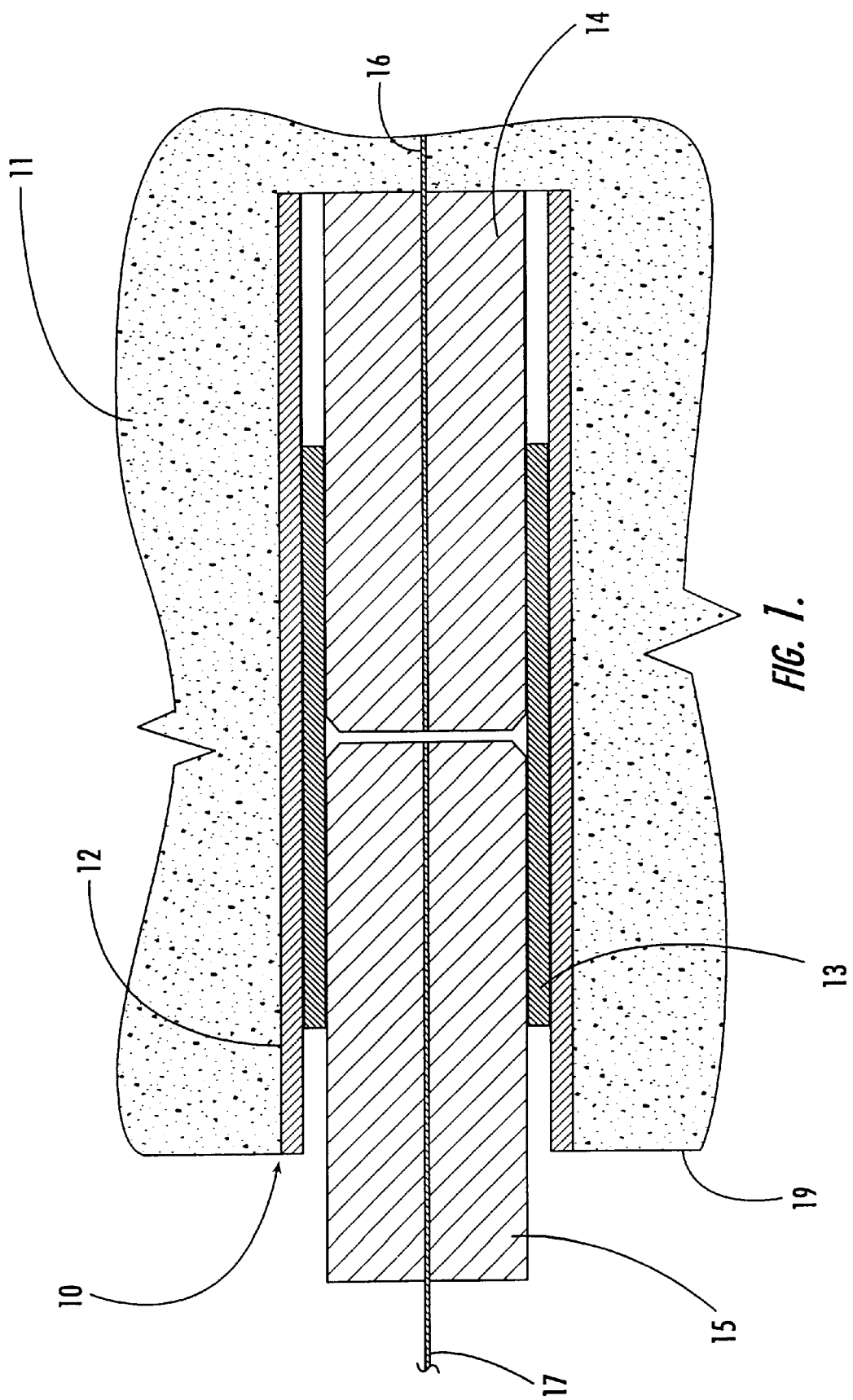
Figure 2:
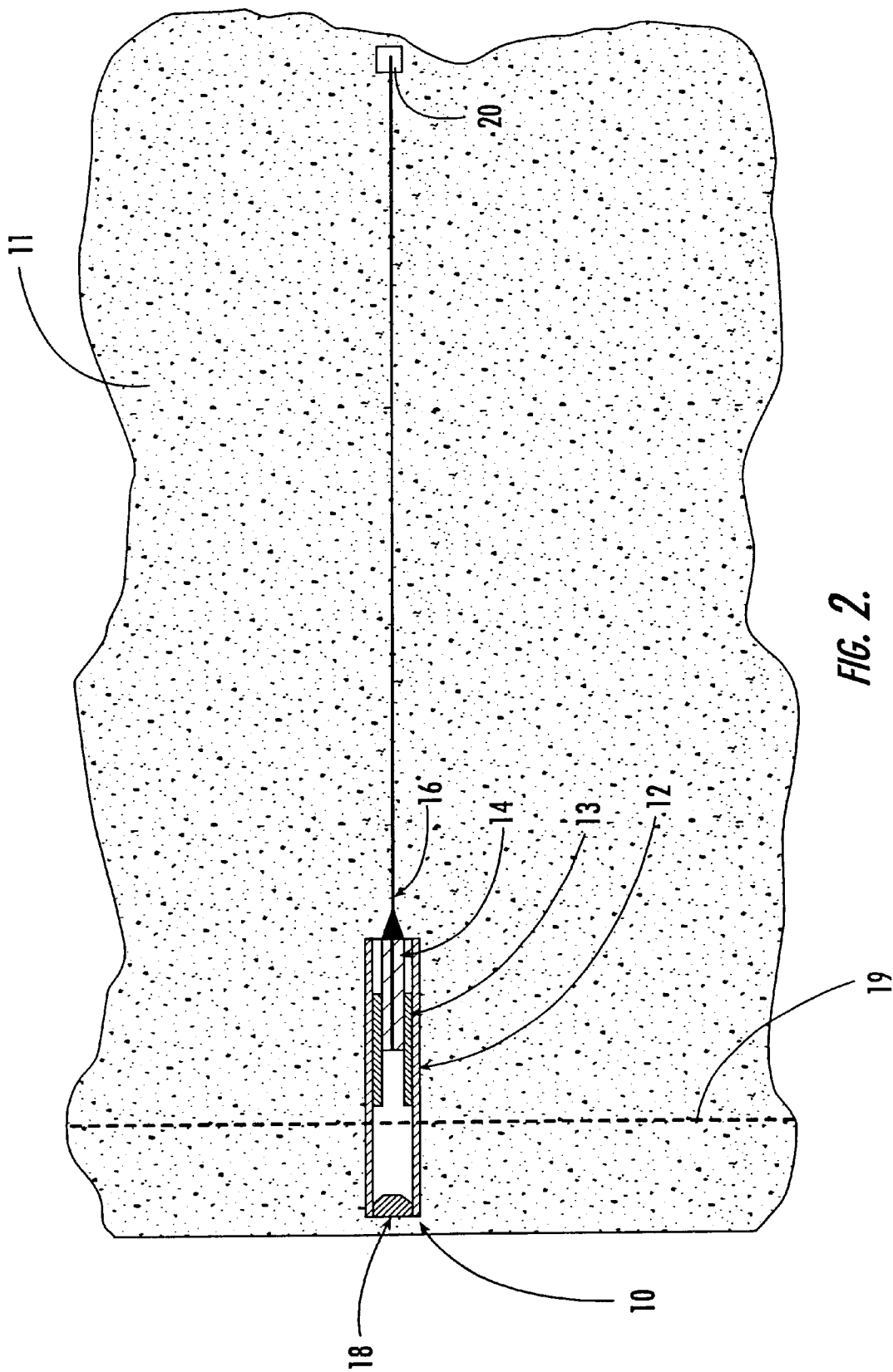
Figure 3:
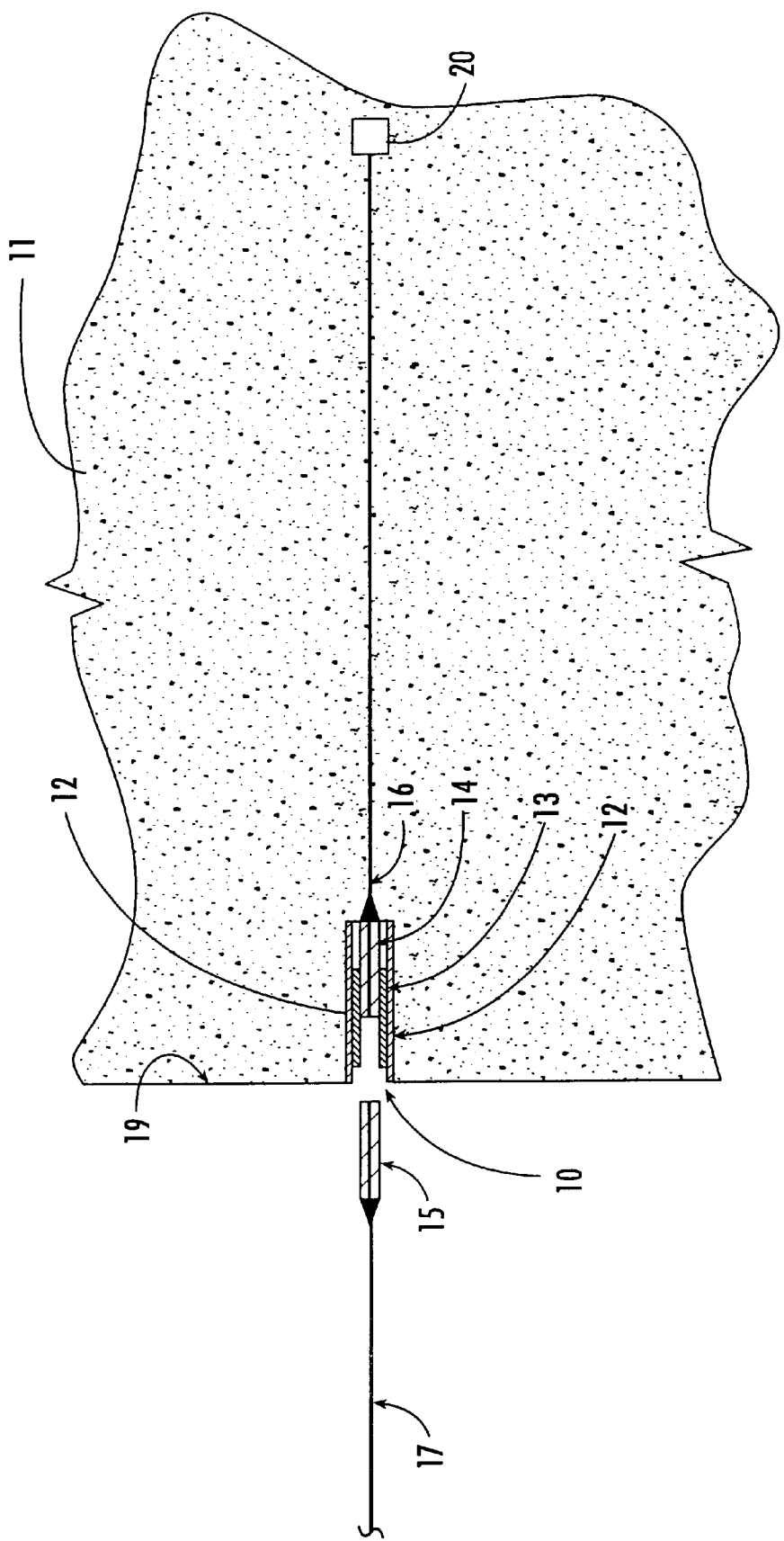

Having thus described the invention in general terms, reference will now be made to the accompanying drawings, which are not necessarily drawn to scale, and wherein:

FIG. 1 is a cross-sectional view of a fiber optic connector of one embodiment of the present invention embedded in a composite structure;

FIG. 2 is a cross-sectional view of the fiber optic connector shown in FIG. 1 after it has been embedded, but before the composite structure has been trimmed; and FIG. 3 is a cross-sectional view of the fiber optic connector shown in FIG. 1 as an external ferrule mounted on an external optical fiber being inserted into the connector thereby placing the internal and external optical fibers in optical communication.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a fiber optic connector 10 of the present invention embedded into a composite structure or part 11 comprised of a plurality of laminated layers. The connector 10 includes a sheath 12 embedded within the laminated layers and an alignment sleeve 13 disposed within the sheath for aligning an internal connector ferrule 14 with an external connector ferrule 15. The internal connector ferrule 14 is mounted on an internal optical fiber 16 while the external connector ferrule 15 is mounted on an external optical fiber 17. The internal optical fiber 16 is embedded within the composite structure 11 and may extend through the composite structure or, in one advantageous embodiment, may be connected to a diagnostic sensor 20, both of which are embedded into the composite structure. The fiber optic connector 10 aligns the internal and external connector ferrules 14 and 15 so as to operably align the optical fibers 16 and 17 and to facilitate the transmission of optical signals therebetween.

The composite structure 11 is preferably constructed by laying up or stacking a number of plies, such as on a tool or mandrel which, at least partially, defines the shape of the resulting composite structure. The plies are thereafter consolidated, such as by an autoclave process, into an integral laminated composite structure 11. The composite structure 11 may then be trimmed into a final shape using a saw or other cutting method.

The above description is not meant to be limiting as the composite structure 11 may be formed by methods other than an autoclave process. Two such methods include a process that uses prepregs or a resin transfer molding (RTM) process. In brief, prepregs are plies of fibrous tow pre-impregnated with thermoset or thermoplastic resin which are individually placed on and consolidated to an underlying structure. In an RTM process, a number of fibers, such as graphite or glass fibers, are woven to form a woven fiber intermediate structure. For example, the fibers can be woven on a loom-type structure as known to those skilled in the art. Resin can then be introduced to the woven fiber intermediate structure such that, once the resin is cured, the resulting composite component formed from the resin-impregnated woven fiber structure is created.

Regardless of the technique by which the composite structure 11 is formed, the fiber optic connector 10 of the present invention is embedded proximate an edge of the composite structure. As shown in FIG. 2, the sheath 12 of the optical fiber connector 10 protects the alignment sleeve 13 and the internal connector ferrule 14 from resin flow during the composite cure process. The sheath 12 is an elongated tubular structure that has sufficient inside clearance to snugly admit the alignment sleeve 13. In order to prevent resin from occluding the sheath 12 during fabrication of the composite structure 11, a resin dam 18 is provided that can be inserted into or affixed to one end of the sheath, i.e., the end of the sheath opposite that end into which the internal connector ferrule is inserted. The resin dam 18 fits tightly within the end of the sheath 12 in order to maintain a cavity in front of the internal connector ferrule 14.

The outside diameter of the sheath 12 is notable as its size dictates the impact the embedded connector 10 has on the structural integrity of the composite structure 11. Without being tied to any particular theory, a sheath having smaller diameter will generally result in less disruption of the structural integrity of the composite structure 11. In the current embodiment, the outside diameter of the sheath 12 is preferably approximately 0.1 inches or less. This size is large enough to allow for easy connection without the use of special tools, while small enough to have almost negligible impact on the strength and integrity of the composite structure 11. Sheaths having even smaller diameters could be used in other embodiments.

Preferably, the sheath 12 is constructed of metal (such as aluminum), ceramic, or another material that is resistant to the curing temperatures of the composite structure 11 which are in the range of 350° F. The material is preferably selected such that it can be easily and cleanly cut as the composite structure 11 is trimmed into its final form, as shown in FIG. 3. Other materials could be used to construct the sheath 12, depending upon the characteristics desired by the user.

The alignment sleeve 13 is preferably another tubular structure that fits snugly inside the clearance of the sheath 12. The alignment sleeve must be carefully manufactured to define an internal passageway that allows concentric alignment of the internal and external connector ferrules and, in turn, the optical fibers 16 and 17 upon which the respective ferrules 14 and 15 are mounted. The inner diameter of the sleeve 13 is slightly undersized relative to the ferrule outer diameter, creating an interference fit between the sleeve and ferrule. A slit along the full length of the sleeve allows the sleeve to expand diametrically to allow insertion of the ferrule, while producing an inward, radial clamping pressure against the ferrule. The radial pressure holds the ferrule in place and maintains its concentric alignment with the mating ferrule. The outside diameter of the alignment sleeve 13 is also preferably manufactured to allow the alignment sleeve to snugly fit into the sheath 12. The alignment sleeve 13 is preferably constructed of a ceramic material so as to withstand the temperatures of the curing process and have rugged, wear-resistant durability, although the alignment sleeve could be constructed of other materials if so desired.

The internal connector ferrule 14 is also preferably constructed of ceramic and is mounted on a terminating end of the internal optical fiber 16 using a polymer resin or the like. Likewise, the external connector ferrule 15 is preferably constructed of ceramic and is mounted upon a terminating end of the external optical fiber 17 using resin. Once mounted upon their respective fibers, the front faces of the ferrules 14 and 15 are typically polished to remove any traces of resin and to define a precision surface. While the optical fibers 16 and 17 may be flush with, or somewhat recessed relative to the front faces of the ferrule, the optical fibers may extend slightly beyond the surface of the ferrules 14 and 15 to allow improved optical communication through actual physical contact of the fibers.

Assembly and use of the optical fiber connector 10 is shown in FIGS. 1 through 3. The alignment sleeve 13 is inserted into an open end of the sheath 12. During insertion, the alignment sleeve 13 is recessed into the sheath 12 wherein the ends of the alignment sleeve are spaced from the ends of the sheath. The resin dam 18 is mounted within one end of the sheath 12. The internal connector ferrule 14 is also mounted upon the internal optical fiber, which, in turn, may be optically connected to an embedded sensor. The internal connector ferrule is then inserted into the other end of the sheath 12 until it snugly fits into the alignment sleeve 13.

As shown in FIG. 2, the connector 20 is embedded into the composite structure 11 during the layup process. The connector 20 is positioned at the edge of the composite structure 11 such that the extra length of the sheath 12 between the resin dam 18 and the alignment sleeve 13 spans the eventual cut-line 19 for the structure edge. The occlusion of both ends of the sheath 12 by the resin dam 18 and the internal connector ferrule 14 prevents the invasion of resin into the connector 10 during curing. Curing typically occurs at a temperature of about 350° F. which the aluminum and ceramic construction of the connector 10 easily resist. Curing hardens the composite layers and preferably fixes the position of the optical fiber connector 10 in the composite structure 11.

The internal optical fiber 16 is also disposed within the layers of the composite structure 11, typically concurrent with the embedding of the optical fiber connector 10. The internal optical fiber can be connected to various sensors including a Fiber Bragg Grating (FBG) sensor for sensing changes in strain. In this regard, an FBG sensor is preferably positioned in locations where the measurement of strain in the composite structure 11 is of interest. FBG sensors are especially useful where an ongoing diagnosis of structural health is important, such as in aircraft parts.

After layup and curing, the composite structure 11 must be trimmed into a desired shape. As shown in FIG. 3, trimming the structure 11 along its cut-line 19 after the structure is cured exposes the connector 10 and removes the end of the sheath 12 with the resin dam 18. Because the sheath 12 is cut along the same line and at the same time as the composite structure 11, the sheath is flush with respect to the surface of the composite structure. This exposed end of the connector 10 provides a readily accessible but well protected interface to the embedded optical fiber 16.

When communication via the internal optical fiber, such as interrogation of the FBG sensor 20, is desired, an external connector ferrule 15 is inserted into the open end of the sheath 12 of the connector 10. As the external connector ferrule 15 is inserted, it extends into the alignment sleeve 13 and is disposed adjacent to the internal connector ferrule 14. Alternatively, the alignment sleeve 13 could be resident on the external connector ferrule 15, and would be inserted with the external connector ferrule to fit onto the internal connector ferrule 14. The optical fibers 16 and 17 are thereby aligned for optical communication because the internal and external ferrules 14 and 15 are concentrically aligned by the alignment sleeve. Ideally, the alignment of the optical fibers 16 and 17 is within approximately 0.00004 inches or less, although some applications may permit a somewhat looser alignment. The precise alignment afforded by the alignment sleeve allows the connection to be established, however, without the use of a specialized alignment tool.

Once the internal and external optical fibers 16 and 17 are aligned communication can be established via the internal optical fiber, such as with embedded sensors or the like. In embodiments in which an FBG sensor is in optical communication with the internal optical fiber 16, the FBG sensor 20 can be interrogated with an optical spectrum analyzer (not shown) that is attached to the external optical fiber 17. The optical spectrum analyzer sends laser light toward the sensor, first through the external optical fiber 17 and then through the internal optical fiber 16 attached to the FBG sensor. The FBG sensor 20 reflects the signal with a certain frequency content back through the internal optical fiber 16 and through the external optical fiber 17 to the optical spectrum analyzer. This frequency content is analyzed by the optical spectrum analyzer and is related to the strains on the composite structure at the location of the FBG sensor 20.

The external connector ferrule 15 can be repeatedly inserted and withdrawn from the optical fiber connector 10 as desired. Detachment of the external connector ferrule 15 from the optical fiber connector 10 typically occurs prior to shipping and assembly of the composite structure 11 or once interrogation of the embedded sensor 20 has been completed. To disassemble the connector 10, the worker grips the rearward portion of the external ferrule 15 which extends beyond the end of the sheath 12 and pulls the external ferrule free of the alignment sleeve 13 and the sheath. Reattachment and detachment can be performed as frequently as needed by repeating the above insertion and detachment processes, respectively. Because the external ferrule 15 and its optical fiber 17 are not bonded to the composite structure 11, removal and reattachment is a fast, simple and repeatable process. Also, because the connector 10 is recessed into the composite structure 11 there is no risk of breaking or otherwise damaging the connector or internal optical fiber 16 after detachment.

In another embodiment (not shown), the internal optical fiber can be connected at both ends to an optical fiber connector. This allows a simple continuity test where light is introduced into one embedded connector, travels through the embedded internal optical fiber and exits the second embedded connector. Both the first and second optical fiber connectors may be embedded within a composite structure proximate the same or different edges. The continuity test detects failure of the optical fiber to transmit a light signal due to occurrences such as rupture of the fiber which might indicate damage to the composite part or a change in the optical properties of the fiber which may indicate such things as a thermal overload of the composite part. Other variations are possible, where sensors or devices that require connection to two (or more) optical fibers are embedded into the composite structure and connected to multiple embedded internal optical fibers, each of which is typically connected to an optical fiber connector.

In addition to FBG strain sensors, other fiber optic sensors can be embedded and used to measure a wide array of structural and environmental conditions relevant to composite structural integrity. This includes such things as strain, temperature, pressure, acceleration, acoustic emission and moisture content present within the composite structure. Therefore, the use of the FBG sensor described herein is only one preferred embodiment is not meant to be limiting.

In yet another embodiment, a single optical fiber connector connects multiple optical fibers embedded within the composite structural part through a single internal ferrule mounted on the ends of the optical fibers. An advantage of this embodiment is that the number of connectors is reduced which in turn reduces the structural impact on the composite part. Each of the optical fibers themselves could be attached to one or several sensors embedded in the composite structure. In still another embodiment, the optical fiber connector could include multiple single fiber ferrules connected through a single sheath.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber optic connector embedded within a composite structure, the connector comprising:
   a sheath embedded within the composite structure and having opposed first and second ends, the first end of the sheath being flush with a surface of the composite structure; and
   an internal connector ferrule mounted upon an optical fiber, the internal connector ferrule having a first end snugly disposed proximate the second end of the sheath.

2. The fiber optic connector described in claim 1, further including an alignment sleeve disposed within the sheath, wherein the first end of the internal connector ferrule is snugly disposed in the alignment sleeve.

3. The fiber optic connector described in claim 2, wherein the alignment sleeve and the internal connector ferrule cooperate to concentrically align the optical fiber within the alignment sleeve to within 0.00004 inches.

4. The fiber optic connector described in claim 2, wherein the sheath is comprised of aluminum and the alignment sleeve and internal connector ferrule are comprised of ceramic thereby allowing the fiber optic connector to withstand composite cure temperatures.

5. The fiber optic connector described in claim 4, wherein said composite cure temperatures are at least 350° Fahrenheit.

6. The fiber optic connector described in claim 1, wherein said sheath has an outside diameter of less than 0.3 inches.

7. The fiber optic connector described in claim 1, wherein the sheath has an outside diameter of less than 0.1 inches.

8. A composite structure, comprising:
   a plurality of layers defining a surface;
   at least one optical fiber embedded within the layers and operable to transmit a signal therethrough; and
   at least one fiber optic connector, each connector comprising:
     a sheath embedded within the plurality of layers and having opposed first and second ends, the first end of the sheath being flush with the surface of the composite structure; and
     an internal connector ferrule mounted upon the at least one optical fiber, the internal connector ferrule having a first end snugly disposed proximate the second end of the sheath.

9. The composite structure described in claim 8, further comprising an alignment sleeve disposed within the sheath, wherein the first end of the internal connector ferrule is snugly disposed in the alignment sleeve.

10. The composite structure described in claim 9, wherein the layers comprise composite laminates.

11. The composite structure described in claim 9, wherein the sheath has an outside diameter of less than 0.30 inches.

12. The composite structure described in claim 9, wherein the sheath has an outside diameter of less than 0.10 inches.

13. The composite structure described in claim 9, wherein the sheath is comprised of aluminum and the alignment sleeve and internal connector ferrule are comprised of ceramic, said aluminum and ceramic allowing the fiber optic connector to withstand composite cure temperatures.

14. The composite structure described in claim 13, wherein said composite cure temperatures are at least 350° Fahrenheit.

15. The composite structure described in claim 9, wherein the alignment sleeve and the internal connector ferrule cooperate to concentrically align the optical fiber within the alignment sleeve to within 0.00004 inches.

16. The composite structure described in claim 8, further comprising a sensor operably connected to at least one optical fiber and embedded within the composite structure.

17. The composite structure described in claim 16, wherein the sensor is a strain sensor.

18. The composite structure described in claim 8, further comprising a second fiber optic connector comprising a second internal ferrule mounted on the at least one optical fiber whereby the at least one optical fiber can be tested for continuity.

19. An assembly of fiber optic components for incorporation into a laminated composite structure, the assembly of fiber optic components comprising:
   a sheath with an inside diameter and an outside diameter, the outside diameter being less than 0.1 inches;
   an alignment sleeve comprising a first and second ends and configured to fit within the sheath; and
   a pair of connector ferrules capable of being mounted on respective optical fibers, the pair of connector ferrules comprising an external connector ferrule and an internal connector ferrule, the external connector ferrule configured to snugly fit within the first end of the alignment sleeve, the internal connector ferrule configured to snugly fit within the second end of the alignment sleeve such that the optical fibers upon which the pair of connecting ferrules are mounted are operably aligned.

20. The assembly of fiber optic components as described in claim 19, further comprising a resin dam configured to be disposed within one end of the sheath during fabrication of the composite structure.

21. The assembly of fiber optic components as described in claim 19, wherein the sheath is constructed of aluminum and the alignment sleeve and connector ferrules are constructed of ceramic, thereby allowing the fiber optic connector to withstand composite cure temperatures.

22. The assembly of fiber optic components as described in claim 19, wherein the alignment sleeve and the internal connector ferrule are configured to cooperate and concentrically align the optical fiber within the alignment sleeve to within 0.00004 inches.

23. A method of embedding a fiber optic connector, comprising the steps of:

layering a plurality of plies to form a composite structure;

positioning the connector proximate an edge of the composite structure during layering of the plies such that a portion of the connector sheath spans a cut line of the composite structure;

curing the composite structure to consolidate the plies;

cutting the composite structure along the cut line and through the connector sheath to define a first end of the sheath that is flush with a surface of the composite structure; and inserting an external connector ferrule into the first end of the sheath so as to establish optical communication between an optical fiber upon which the external connector ferrule is mounted and an optical fiber disposed within the composite structure.

24. The method of embedding a fiber optic connector as described in claim 23, wherein the fiber optic connector further includes an internal connector ferrule and wherein the method further comprises mounting the internal connector ferrule on the internal optical fiber prior to positioning the connector.

25. The method of embedding a fiber optic connector as described in claim 24, wherein the fiber optic connector further includes an alignment sleeve, and wherein the method further comprises snugly disposing a first end of the internal connector ferrule proximate a second end of the sheath, opposite the first end, and within the alignment sleeve prior to positioning the connector.

26. The method of embedding a fiber optic connector as described in claim 25, further comprising the step of embedding the internal optical fiber in the composite structure during the layering of the plies.

27. The method of embedding a fiber optic connector as described in claim 25, further comprising embedding a sensor in the composite structure and connecting the internal optical fiber to the sensor prior to positioning the connector.

28. The method of embedding a fiber optic connector as described in claim 23, further comprising the step of mounting a resin dam within the first end of the connector sheath to protect the internal ferrule from resin intrusion during the curing step.

* * * * *